United States Patent
Kim et al.

(10) Patent No.: US 8,529,743 B2
(45) Date of Patent: Sep. 10, 2013

(54) ELECTROWETTING-DRIVEN MICROPUMPING

(75) Inventors: Chang-Jin Kim, Beverly Hills, CA (US); Junghoon Lee, Wilmette, IL (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 10/343,261

(22) PCT Filed: Jul. 25, 2001

(86) PCT No.: PCT/US01/23506
§ 371 (c)(1),
(2), (4) Date: Jan. 27, 2003

(87) PCT Pub. No.: WO02/07503
PCT Pub. Date: Jan. 31, 2002

(65) Prior Publication Data
US 2003/0205632 A1    Nov. 6, 2003

Related U.S. Application Data

(60) Provisional application No. 60/220,803, filed on Jul. 25, 2000.

(51) Int. Cl.
*B01D 57/02* (2006.01)
*C02F 1/40* (2006.01)

(52) U.S. Cl.
USPC ............................. 204/450; 204/600

(58) Field of Classification Search
USPC ............. 204/450, 451, 454, 600, 601, 602; 345/37, 84, 107; 422/505; 417/48
See application file for complete search history.

(56) References Cited

U.S. PATENT DOCUMENTS

| | | | | |
|---|---|---|---|---|
| 3,872,480 A | * | 3/1975 | Engelbrecht | 347/149 |
| 3,934,180 A | * | 1/1976 | Kiess et al. | 361/225 |
| 4,390,403 A | * | 6/1983 | Batchelder | 204/547 |
| 4,636,785 A | * | 1/1987 | Le Pesant | 345/37 |
| 4,742,345 A | * | 5/1988 | Di Santo et al. | 345/107 |
| 4,818,052 A | * | 4/1989 | Le Pesant et al. | 385/17 |
| 5,181,016 A | * | 1/1993 | Lee | 345/84 |
| 5,757,345 A | * | 5/1998 | Sheridon | 345/84 |
| 5,808,593 A | * | 9/1998 | Sheridon | 345/84 |
| 5,929,960 A | * | 7/1999 | West et al. | 349/156 |
| 6,379,929 B1 | * | 4/2002 | Burns et al. | 435/91.2 |
| 6,565,727 B1 | | 5/2003 | Shenderov | |
| 6,600,888 B2 | * | 7/2003 | Mishra et al. | 399/174 |
| 6,661,563 B2 | * | 12/2003 | Hayashi et al. | 359/296 |
| 6,773,566 B2 | * | 8/2004 | Shenderov | 204/450 |

(Continued)

OTHER PUBLICATIONS

Lee, J., et al., Surface-Tension-Driven Microactuation Based on Continuous Electrowetting, *Journal of Microelectromechanical Systems*, vol. 9, No. 2, Jun. 2000, 2000 IEEE.

*Primary Examiner* — Thomas Denion
*Assistant Examiner* — Diem Tran
(74) *Attorney, Agent, or Firm* — Gates & Cooper LLP

(57) ABSTRACT

An apparatus and method fox micropumping is disclosed. The apparatus includes a virtual or physical microchannel and at least two hydrophobic electrode patches on a surface or two electrode patches disposed underneath a dielectric film proximate to the channel. Each of the electrode patches modifies a surface property between hydrophobic and hydrophilic states in response to an electrical potential applied between the liquid and the electrode, and the electrical potential is provided to digitize the liquid, drive the liquid segments, and mix different liquids.

30 Claims, 6 Drawing Sheets

(56) References Cited

U.S. PATENT DOCUMENTS

| | | | |
|---|---|---|---|
| 6,897,848 B2* | 5/2005 | Sheridon | 345/107 |
| 6,924,792 B1* | 8/2005 | Jessop | 345/179 |
| 6,949,176 B2* | 9/2005 | Vacca et al. | 204/547 |
| 7,167,156 B1* | 1/2007 | Glass | 345/107 |
| 2002/0043463 A1 | 4/2002 | Shenderov | |
| 2003/0164295 A1 | 9/2003 | Sterling | |
| 2004/0055536 A1* | 3/2004 | Kolar et al. | 118/626 |
| 2004/0055891 A1* | 3/2004 | Pamula et al. | 205/98 |
| 2004/0058450 A1* | 3/2004 | Pamula et al. | 436/150 |
| 2007/0115308 A1* | 5/2007 | Hisano et al. | 347/7 |

\* cited by examiner

ELECTROWETTING-DRIVEN MICROPUMPING

CROSS-REFERENCE TO RELATED APPLICATIONS

This application claims the benefit under 35 U.S.C. §119 (e) of co-pending and commonly assigned U.S. Provisional Patent Application Ser. No. 60/220,803, filed on Jul. 25, 2000, by Chang-Jin Kim and Junghoon Lee, entitled "ELECTROWETTING-DRIVEN MICROPUMPING," which application is incorporated by reference herein.

STATEMENT REGARDING FEDERALLY SPONSORED RESEARCH OR DEVELOPMENT

This invention was made with Government support under Grant No. 9980874 awarded by the National Science Foundation. The Government has certain rights in this invention.

BACKGROUND OF THE INVENTION

1. Field of the Invention

The present invention relates to methods and systems for pumping and manipulating liquids in microscale, and particularly to methods and systems based on electrowetting principles.

2. Description of the Related Art

Mechanical micropumping systems may use various actuation mechanisms including piezoelectric, thermal, shape memory alloy, and electrostatic actuation systems. Such methods and systems employ moving parts which result in a system of diminished reliability, increased power consumption, or high operating voltage.

Direct micropumping methods and systems may employ actuation based upon principles such as electrophoresis, electroosmosis, magnetohydrodynamic, and thermally-induced surface tension. An electrophoresis based system is limited because it requires that the operating liquid contains ionic particulates. In addition, electrophoresis and electroosmosis approaches require high voltage an a high energy dissipation and operate at low speed. Magnetohydrodynamic and thermally-induced surface tension mechanisms require relatively high power to operate as well.

The area of micropumping is directed at moving very small volumes of liquid, typically within a single conduit. Ideally, a more advanced micropumping method and system would allow more complex manipulation of the liquid, such as "digitizing" a liquid (separating and manipulating increments of liquid) in very small volumes (as small as sub-picoliter). Complex manipulation would allow for mixing and moving liquid in a microfluidic matrix or circuit. However, none of the developed techniques for micropumping allow for such complex picoliter manipulation of the operating liquid.

Electrowetting is a principle whereby the surface wetting property can be modified between the hydrophobic and hydrophilic states using an electric field. The surface can be hydrophobic conductive layer or conductive layer covered with hydrophobic dielectric film. A droplet of liquid can bead or spread on the surface depending on the surface state. A liquid lens with an adjustable focus has been developed using this principle, however, there has been no application to micropumping.

There is a need for micropumping methods and systems which operate without moving mechanical parts. There is further a need for such systems and methods which operate at relatively low power and voltage and achieve a relatively high speed. There is still further a need for such methods and systems which function without requiring ionic particulates in the operating liquid. Finally, there is a need for methods and systems which will enable complex manipulation of sub-microliter liquid volumes. The present invention meets all of these needs.

SUMMARY OF THE INVENTION

An apparatus and method for micropumping is disclosed. The apparatus comprises a a virtual or physical microchannel and at least two hydrophobic electrode patches disposed proximate to the channel. Each of the electrode patches modifies a surface property of itself or of the dielectric film covering it between hydrophobic and hydrophilic states in response to an electrical potential applied between the electrode and the liquid. The electrical potential is provided to selected electrode patches to drive the liquid along the channel, digitize the liquid, drive the liquid segments, and mix different liquids.

One embodiment of the invention comprises a structure including one or more channels for a liquid and at least two hydrophobic electrode patches proximate to the channels. Each of the electrode patches modifies a surface property of the structure between hydrophobic and hydrophilic states in response to an electrical potential applied between the liquid and the electrode patches. A further embodiment comprises a means for grounding a first one of the electrode patches to produce a hydrophobic state on a first region of the structure proximate the first one of the electrode patches and means for applying the electric potential to a second one of the electrode patches to produce a hydrophilic state on a second region of the structure proximate the second one of the electrode patches.

In another embodiment, a column of the liquid spans the first and second one of the electrode patches and a third one of the electrode patches proximate a middle section of the column of liquid is dewetted such that a liquid segment separates from the column of the liquid. One or more channels can include a breathing path to admit air into the channels to allow the liquid to flow freely in the channels and aid such segmenting. A segment of the liquid may also be driven by applying the electrical potential and wetting a first one of the electrodes at a first end of the segment while grounding and dewetting a second one of the electrodes at a second end of the segment. Conveniently, the electrode patches can be arranged in an array and the electrode patches can be arranged along the one or more channels. Furthermore, the operating liquid may be an electrolyte.

In yet another embodiment, the apparatus further comprises a reservoir connected to one or more of the channels, wherein the electrode patches are positioned in the channels and draw liquid from the reservoir into the channels.

In other embodiments, the apparatus may comprise one or more junctions, each of the junctions connecting more than two of the channels. Electrode patches can be positioned at each of the junctions and the liquid can be mixed with a second liquid at the junctions. The channels and one or more junctions can form a fluidic circuit which can be an m×n grid of the channels and the junctions.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The invention uses the principle of electrowetting, which includes the principle of electrowetting on dielectric film (EWOD), in driving or pumping liquid segments on a surface or in a channel. In a typical embodiment, an array of electrodes is patterned and coated with a thin hydrophobic dielectric layer. An aqueous liquid fills up to the edge of the hydrophobic region. Upon applying electric potential between the liquid and the buried electrode underneath the hydrophobic coating, i.e. the dielectric film, the hydrophobic region becomes hydrophilic, making the liquid advance and wet the region of dielectric film above the activated electrodes.

The present invention can be realized through microfabrication technologies. Low voltage and low power on-chip liquid-handling microsystems of high complexity become possible with the present invention. The micro liquid handling system of the present invention finds its utility in many microdevices such as miniature chemical analysis systems, biomedical devices and micro-optical devices.

Driving Liquid by Electrowetting

Figure 1:
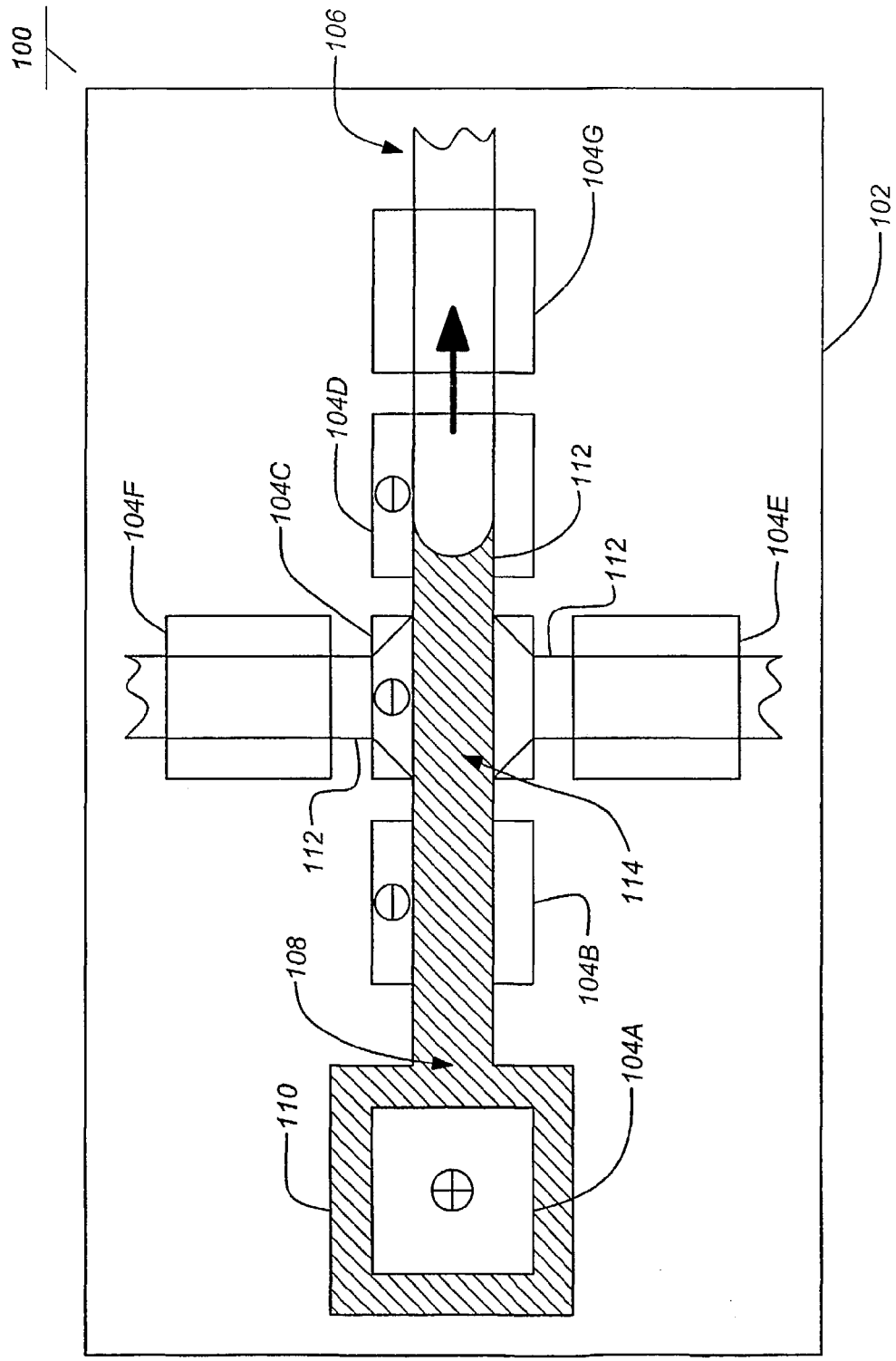
FIG. 1 illustrates the principle of drawing a liquid into channel by electrowetting in the invention.

FIG. 1 illustrates the principle of drawing a liquid into the channel by electrowetting in the invention. In the example EWOD device 100, a wetted region of a generally non-wetting surface 102 has more than two electrode patches 104A-104G. Channels 106 may be used to direct and contain an operating liquid 108. An input operating liquid 108 (such as an electrolyte) may be initially contained in a channel 106 forming a reservoir 110 which surrounds a first patch 104A. An electric potential is formed between the operating liquid 108 and driving electrodes by grounding (shown as positive charge) a first electrode patch 104A at one end of the operating liquid 108 and activating (shown as negative charge) the three electrode patches 104B-104D, resulting in the liquid 108 being driven or advanced between the electrode patches 104A and 104B-104D as indicated by the arrow in FIG. 1. The hydrophobic surface 102 obtains a hydrophilic state where any of the patches 104A-104G is turned on. If any one of the patches 104A-104G is turned off or grounded, the area of the hydrophobic film 102 proximate the patch 104A-104G becomes hydrophobic.

It should be noted that the hydrophobic electrode patches themselves may be hydrophobic or they may be made hydrophobic by being covered with hydrophobic dielectric film.

In some areas, such as reservoirs 110, direct contact between the operating liquid 108 and the electrode patch 104A may be desirable to avoid driving the liquid 108 completely away. By positioning the electrode patches 104A-104G along the channel 106 (typically in an array) and sequentially charging the patches 104B-104G, a liquid 108 may be drawn into the channel.

The channel 106 may also include a plurality of paths 112 from a junction 114. By selectively charging the patches 104D-104F as the liquid 108 passes the junction 114, the liquid 108 may be directed down the different paths 112. In addition, using the invention, a liquid may also be cut or digitized into separate liquid segments.

Liquid Digitization and Driving

Figure 2:
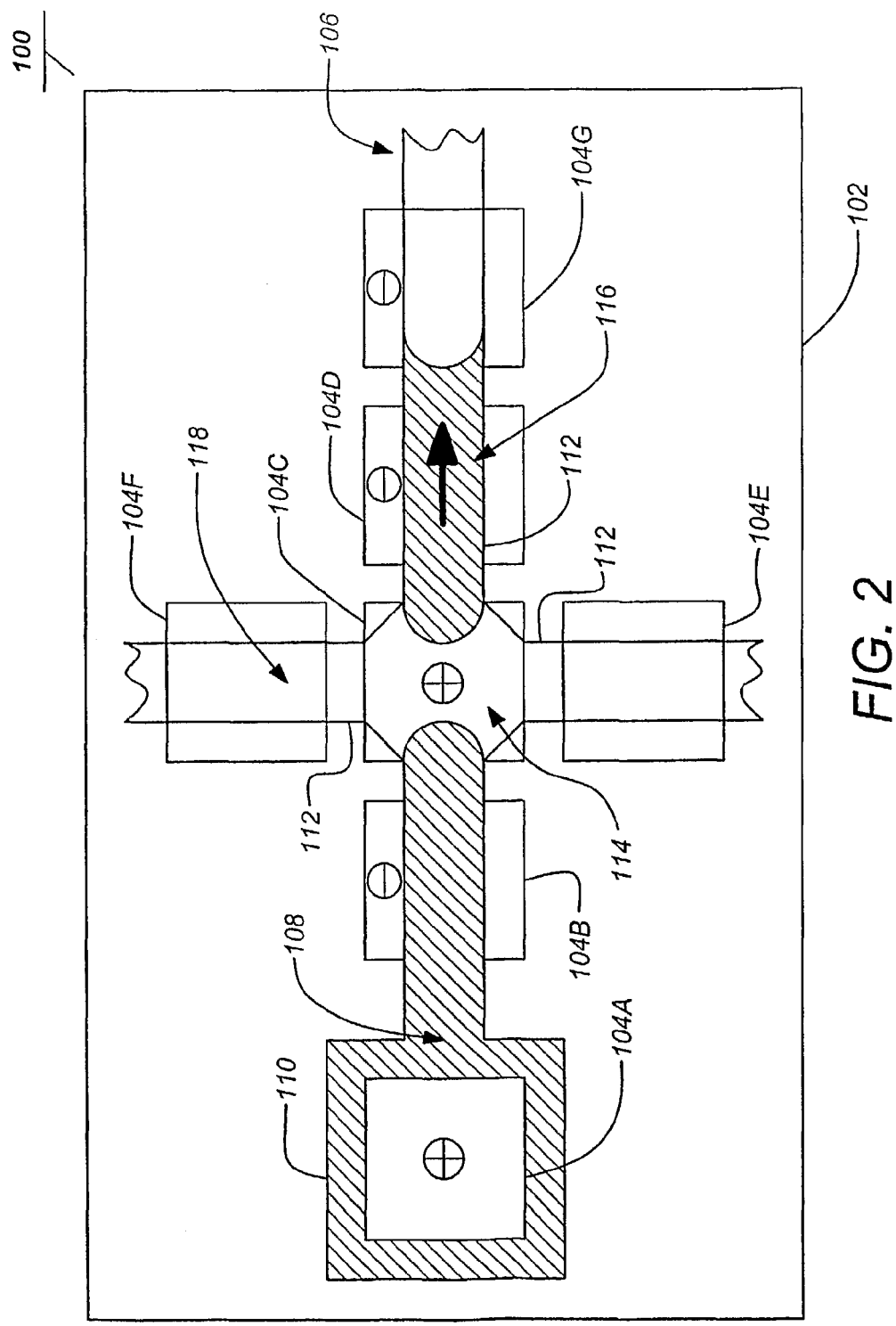
FIG. 2 illustrates digitization of a liquid element and driving it by electrowetting in the invention.

FIG. 2 illustrates digitization of a liquid element and driving it. In digitization, a long liquid element drawn in by activating the electrode patches 104B-104G is cut into a separate liquid segment 116 by turning off the electrode patch 104C and returning it to hydrophobic state. An important aspect of the invention to create separated segments 116 and allow it to move along the channel is the use of breathing paths 118 which allow the liquid 108 to flow freely in the channel 106. A breathing path 118 is especially important when the liquid 108 is digitized as air must flow in order for the gap to be formed. Breathing paths 118 may be part of the channel 106 for manipulating the liquid 108 or specially formed. Or, the channel 106 can be even virtual, in which case there is no physical barrier that defines the channel. When the channel is open and liquid path is prescribed by activating a series of electrodes, there is no need for the breathing path 108. Once a liquid segment 116 is created, it can be driven by activating and wetting the electrode 104G at one end of the segment while grounding and dewetting the electrode 104C at the other end.

The smallest amount of the digitized liquid is limited by lithography technology; sub-picoliter digitization is possible with 3 micron lithography. The digitized liquid segment can be driven along a channel 108 between electrode patches 104A-104G, as indicated by the arrow in FIG. 2, by a sequential potential application applied to the electrode patches 104A-104G. The channel 106 may be any configuration of paths 112 on the hydrophobic 102 surface, defined during the mask design process.

Integrated Microfluidic Circuit

Figure 3:
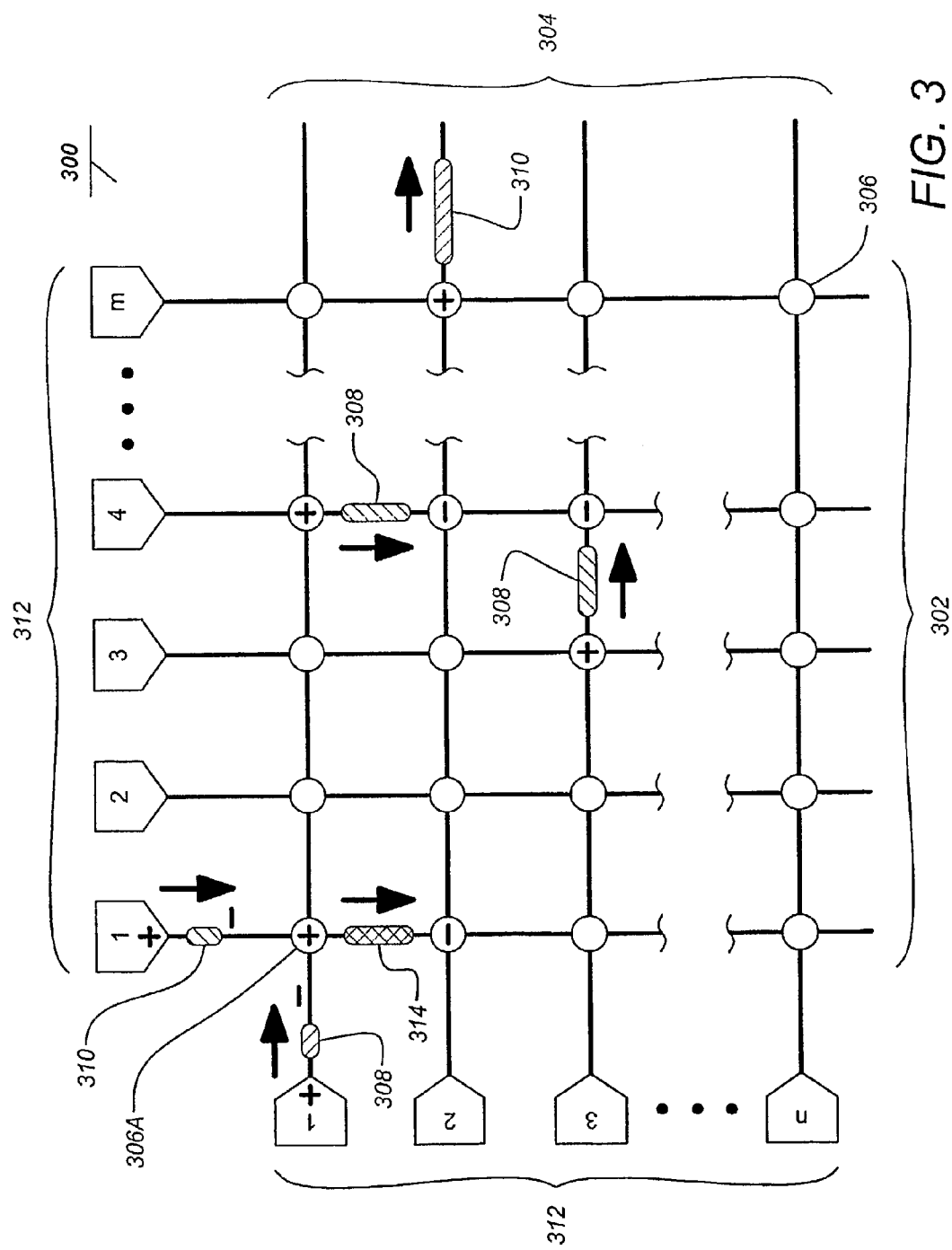
FIG. 3 illustrates a fluidic circuit grid embodiment of the invention.

FIG. 3 illustrates a fluidic circuit 300 of the invention. Employing the features and elements described, a complex fluidic circuit may be designed including a plurality of electrode patches 104, paths 112, junctions 114 and reservoirs 110. Any circuit architecture is possible and more than one liquid may be used in the circuit. In the example of FIG. 3, the circuit 300 is laid out in an m×n grid of m vertical paths 302 and n horizontal paths 304 with junctions 306 at each vertical and horizontal path 302, 304 intersection. Liquid segments 308, 310 are introduced to the circuit 300 at the reservoirs 312 so they may be manipulated within the circuit 300. In a circuit 300 manipulating more than one liquid type, two liquid segments 308, 310 may be mixed at a junction 306A to produce a mixed liquid segment 314.

Based on the two functions detailed above, separation of a liquid into droplets, i.e., digitization, and driving of individual droplets, mixing of droplets is made possible on a chip-scale microdevice. This digitized fluidic circuit plays the key role for several applications.

Figure 4A:
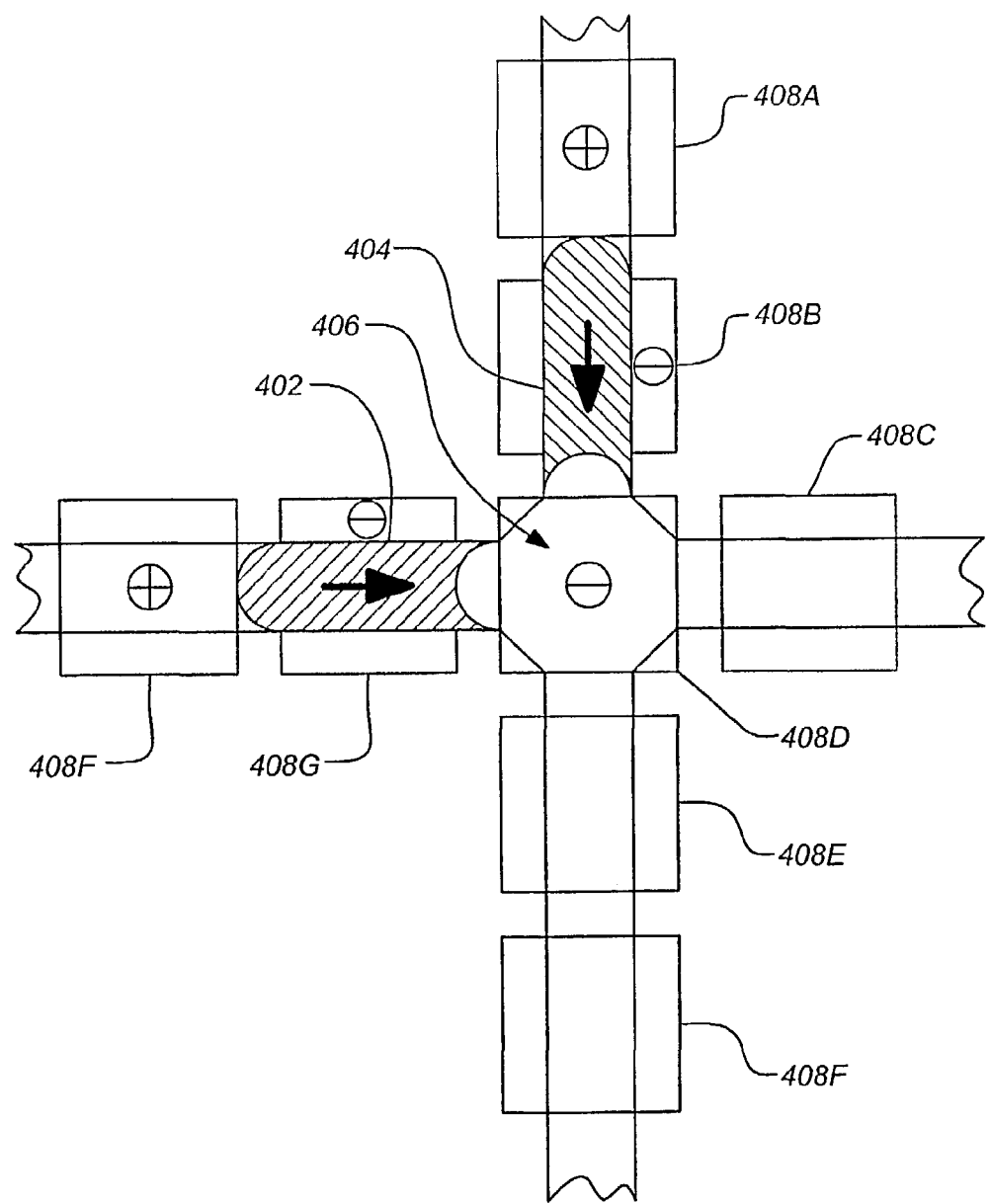
FIGS. 4A-4C illustrates liquid mixing at a junction of a fluidic circuit in the present invention.
Figure 4B:
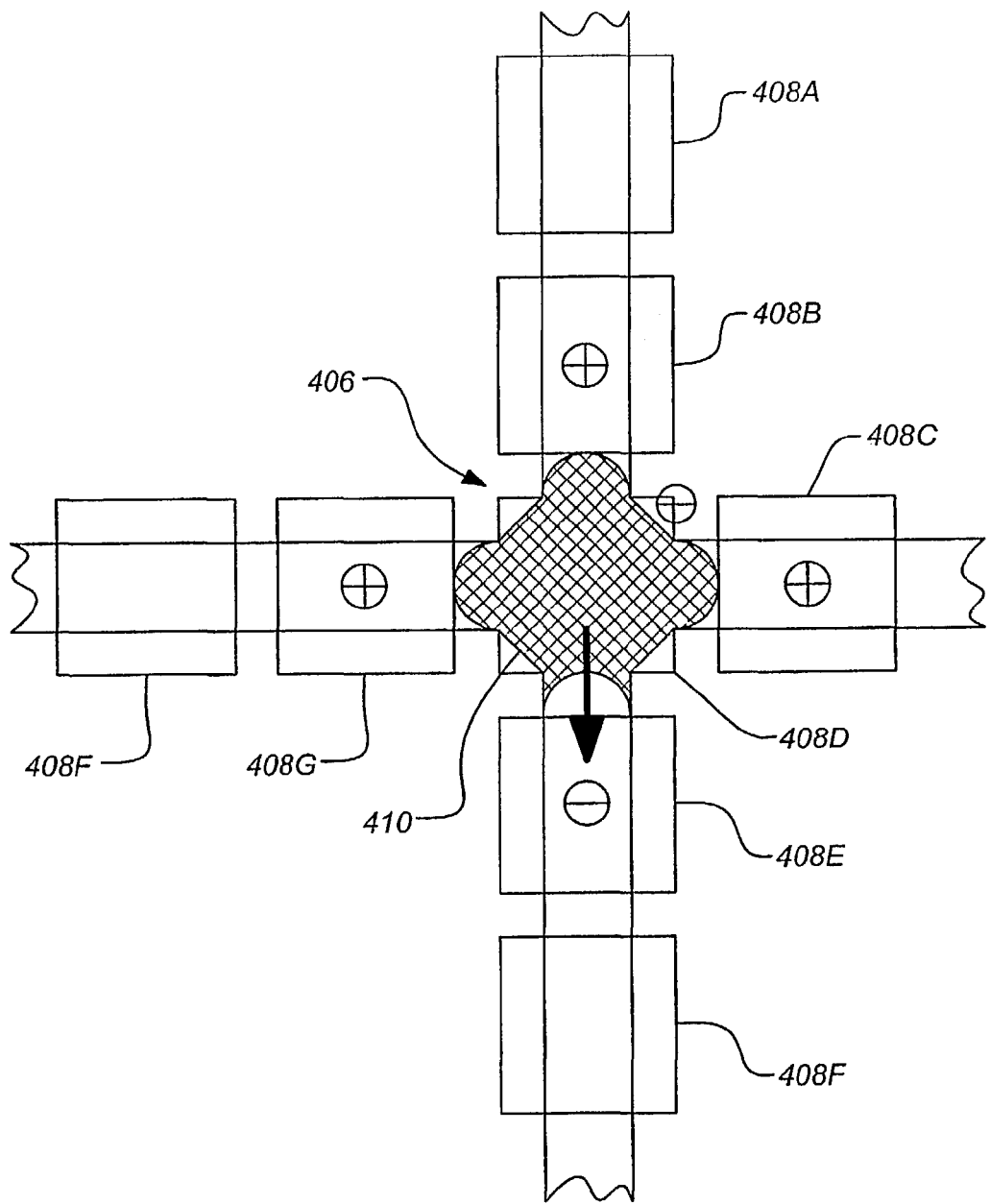
Figure 4C:
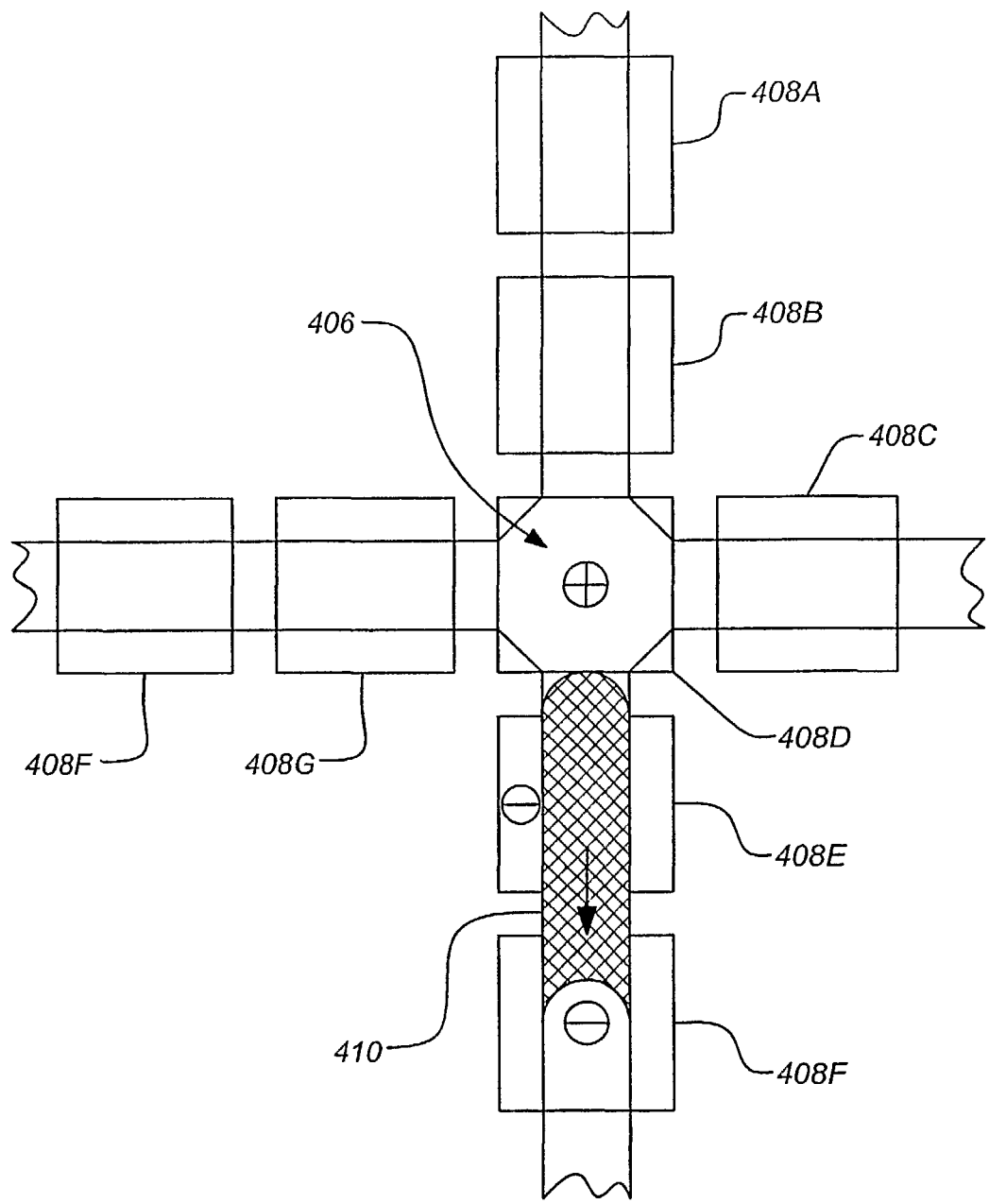

FIGS. 4A-4C illustrates liquid mixing at a junction of a fluidic circuit in the present invention. In FIG. 4A first liquid 402 and a second liquid 404 are both driven to a junction 406 by appropriate charges on the electrode patches 408A, 408B, 408D, 408F, 408G, resulting in the liquid 404 being driven or advanced between the electrode patches 408A, 408B, 408D and the liquid 402 being advanced between the electrode patches 408F, 408G, 408D, as indicated by their respective arrows in FIG. 4A. In FIG. 4B, the first and second liquids 402, 404 are mixed at the junction 406 to form a mixed liquid 410. Appropriate charges on the electrode patches 408B, 408C, 408D, 408E, 408G begin to drive or advance the liquid 410 from the junction, and between electrode patches 408D and 408E as indicated by the arrow in FIG. 4B. Finally, in FIG. 4C, the mixed liquid 410 is driven along the path by charges applied to patches 408D, 408E, 408F, resulting in the liquid 410 being driven or advanced between the electrode patches 408D, 408E, 408F, as indicated by the arrow in FIG. 4C.

The invention can improve many microdevices which handle liquids in microscale, and is not bound by specific applications. Micro fluid pumps, micro total analysis system (µ-TAS), micro optical (especially integrated waveguide) switching networks, and micro RF switches are some of the possible applications where the present invention can be used for more effective fluid handling in microscale. Due to the self-contained nature of pumping and low power consumption, the invention is especially attractive for hand-held or implanted on-chip micro fluidic systems.

Surface tension, a dominant force in the microscale, is used as a driving force to move liquids in the present invention. As a result, liquids can be pumped or transferred very effectively, requiring extremely low power consumption compared to thermal or magnetic micropumping mechanisms. Low voltage, low energy dissipation, and high speed are achievable with the present invention when compared with electrophoresis and electroosmosis driven systems. Also, the pumping media of the present invention does not need to have ionic particulates winch are necessary for electrophoresis type systems. The present invention also has no moving mechanical parts, because the liquid segment is driven by its own surface tension. The elimination of moving mechanical parts gives the present invention longer life and better reliability compared to mechanical micropumping systems.

The present invention also allows liquids to be digitized even in sub-pico-liter volumes, which is impossible with any other existing techniques. Further, there is no cross talk between individual movement of liquid segments. Many (n×m) liquid segments can be moved in a parallel fashion with the present invention. This function is unattainable with any other existing micropumping mechanism. Lithography-based microfabrication makes the microactuation in a complex matrix of channels possible and easily achieved.

The mechanism of the present invention has a large impact on many areas, including biomedical, chemical, and telecommunication applications. This technique enables very large scale (e.g., 1000×1000) networking of liquid with minimal energy consumption, which are not feasible with existing techniques. Extreme miniaturization can be achieved for the suggested devices and liquid handling system. The fabrication process is relatively simple, requiring no mechanically moving parts or complex packaging procedures, resulting in a dramatic reduction of product cost. The invention is expected to make disposable bio- and/or chemical lab-on-chips commercially attractive.

REFERENCES

The following references are incorporated by reference herein:

Wettability, edited by John C. Berg, Marcel Dekker, Inc., New York, 1993, pp. 162-164.
U.S. Pat. No. 4,583,824, Electrocapillary Devices, Apr. 22, 1986.
European Patent No. 9519461.9, April, 1995.

CONCLUSION

This concludes the description including the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. An apparatus for micropumping, comprising:
a structure including one or more channels for a non-dielectric liquid; and
at least two hydrophobic electrode patches proximate to the channels;
wherein the electrode patches are sequentially charged to pump the liquid along the channels and to advance the liquid between at least two of the electrode patches, each of the electrode patches modifies a surface property of the structure between hydrophobic and hydrophilic states in response to an electrical potential applied between the liquid and the electrode patches, so that when the electric potential is applied between the liquid and the electrode patches, surfaces of the channels proximate to the electrode patches become hydrophilic and the liquid wets the surfaces of the channels proximate to the electrode patches, and
wherein complex manipulation of the liquid is performed, by digitizing the liquid using the electrode patches to separate increments of the liquid pumped along the channels, and by mixing segments of the liquid pumped along the channels using the electrode patches at junctions between the channels.

2. The apparatus of claim 1, wherein the electrode patches are arranged in an array.

3. The apparatus of claim 1, wherein the liquid is an electrolyte.

4. The apparatus of claim 1, wherein a segment of the liquid is driven by applying the electrical potential and wetting a first one of the electrodes at a first end of the segment while grounding and dewetting a second one of the electrodes at a second end of the segment.

5. The apparatus of claim 1, wherein the electrode patches are arranged along the one or more channels.

6. The apparatus of claim 1, further comprising a reservoir connected to one or more of the channels, wherein the electrode patches are positioned in the channels and draw liquid from the reservoir into the channels.

7. The apparatus of claim 1, wherein one or more of the channels include a breathing path to admit air into the channels to allow the liquid to flow freely in the channels.

8. The apparatus of claim 1, wherein the channels are virtual channels and no physical barriers define the virtual channels.

9. The apparatus of claim 1, wherein the electrical potential is applied between the liquid and the electrode patches by grounding a first one of the electrode patches to produce a hydrophobic state on a first region of the structure proximate the first one of the electrode patches and by applying the electric potential to a second one of the electrode patches to produce a hydrophilic state on a second region of the structure proximate the second one of the electrode patches.

10. The apparatus of claim 9, wherein a column of the liquid spans the first and second one of the electrode patches and a third one of the electrode patches proximate a middle section of the column of liquid is dewetted such that a liquid segment separates from the column of the liquid.

11. The apparatus of claim 1, further comprising one or more junctions, wherein each of the junctions connects two or more of the channels.

12. The apparatus of claim 11, wherein one of the electrode patches is positioned at each of the junctions.

13. The apparatus of claim 11, wherein the liquid is mixed with a second liquid at one or more of the junctions.

14. The apparatus of claim 11, wherein the channels and the junctions form a fluidic circuit.

15. The apparatus of claim 14, wherein the fluidic circuit is an m×n grid of the channels and the junctions.

16. A method for micropumping, comprising the steps of:
providing a structure including one or more channels for a non-dielectric liquid;
forming at least two hydrophobic electrode patches proximate to the channels; and
sequentially charging the electrode patches to pump the liquid along the channels and to advance the liquid between at least two of the electrode patches, wherein an electrical potential is applied between the liquid and the electrode patches to modify a surface property of the structure between hydrophobic and hydrophilic states, so that when the electric potential is applied between the liquid and the electrode patches, surfaces of the channels proximate to the electrode patches become hydrophilic and the liquid wets the surfaces of the channels proximate to the electrode patches, and
wherein complex manipulation of the liquid is performed, by digitizing the liquid using the electrode patches to separate increments of the liquid pumped along the channels, and by mixing segments of the liquid pumped along the channels using the electrode patches at junctions between the channels.

17. The method of claim 16, wherein the electrode patches are arranged in an array.

18. The method of claim 16, wherein the liquid is an electrolyte.

19. The method of claim 16, wherein a segment of the liquid is driven by activating and wetting a first one of the electrode patches at a first end of the segment while grounding and dewetting a second one of the electrode patches at a second end of the segment.

20. The method of claim 16, wherein the electrode patches are arranged along the one or more channels.

21. The method of claim 16, further comprising a reservoir connected to one or more of the channels, and wherein the electrode patches are positioned in the channels and draw liquid from the reservoir into the channels.

22. The method of claim 16, wherein one or more of the channels includes a breathing path to admit air into the channels to allow the liquid to flow freely in the channels.

23. The method of claim 16, wherein the channels are virtual channels and no physical barriers define the virtual channels.

24. The method of claim 16, wherein the electrical potential is applied between the liquid and the electrode patches by grounding a first one of the electrode patches to produce a hydrophobic state on a first region of the structure proximate the first one of the electrode patches and by applying the electric potential to a second one of the electrode patches to produce a hydrophilic state on a second region of the structure proximate the second one of the electrode patches.

25. The method of claim 24, wherein a column of the liquid spans the first and second one of the electrode patches and a third one of the electrode patches proximate a middle section of the column of liquid is dewetted such that a liquid segment separates from the column of the liquid.

26. The method of claim 16, further comprising one or more junctions, wherein each of the junctions connect two or more of the channels.

27. The method of claim 26, wherein a one of the electrode patches is positioned at each of the junctions.

28. The method of claim 26, wherein the liquid is mixed with a second liquid at the one or more junctions.

29. The method of claim 26, wherein the channels and the junctions form a fluidic circuit.

30. The method of claim 29, wherein the fluidic circuit is an m×n grid of the channels and the junctions.

* * * * *